United States Patent Office 3,383,314
Patented May 14, 1968

3,383,314
ARYL FERROCENE ANTIOXIDANTS IN POLYPHENYL OXA AND THIA ETHER FUNCTIONAL FLUIDS
Emil Herbert Carlson, Kirkwood, Mo., assignor to Monsanto Company, a corporation of Delaware
No Drawing. Filed Jan. 2, 1964, Ser. No. 335,394
1 Claim. (Cl. 252—46.4)

This invention is directed to polyphenyl ether functional fluid compositions containing effective amounts of aryl ferrocene compounds as antioxidants therein.

The polyphenyl ethers are known compounds found to have excellent thermal stability, very good hydrolytic stability, excellent liquid range, fair pour point, good lubricity, generally good viscosity properties, generally good oxidation stability, very good radiation stability, and excellent useful life at elevated temperatures of the order of about 800° F. and higher, whereby they have found wide application as functional fluid compositions being particularly suitable for high-temperature systems. Thus, the polyphenyl ether functional fluids can be employed as synthetic lubricants in motor operations generally, for jet engines, for supersonic aircraft and missiles, as hydraulic fluids, as diffusion pump fluids, as coolant for electronic equipment, as coolant-moderators for nuclear reactors, as heat-transfer agents, etc.

Representative polyphenyl ether compositions are disclosed in the copending applications of Blake and Hammann, Ser. Nos. 702,767, filed Dec. 16, 1957, now abandoned and common subject matter thereof set out in U.S.P. 3,203,997, issued Aug. 31, 1965; 766,685, filed Oct. 13, 1958; and 101,081, filed Apr. 6, 1961, now abandoned; and my copending application Ser. No. 102,662, filed Apr. 13, 1961, now U.S.P 3,240,817, issued Mar. 15, 1966, all of which applications are incorporated herein by reference.

The polyphenyl ether functional fluid compositions maintain their excellent properties over a wide temperature range up to 800° F. and higher for an extended period of time when employed in a closed system, i.e., in an inert atmosphere. However, at temperatures over about 550° F., wherein the polyphenyl ether compositions are employed in systems exposed to the atmosphere, i.e., exposed to oxygen, the said functional fluid compositions tend to deteriorate over a period of time due to oxidation of the compositions. The oxidation products built up in a particular polyphenyl ether composition gradually effects a substantial increase in viscosity thereof and shortens the useful life of the functional fluid composition.

The principal object of the instant invention is to provide polyphenyl ether functional fluid compositions having improved physical and chemical properties. Another object of the present invention is to provide polyphenyl ether compositions having improved resistance to oxidation at temperatures above about 550° F. Still another object of the present invention is to provide polyphenyl ether functional fluid compositions which possess improved time-temperature-viscosity characteristics. Other objects and advantages of this invention will be apparent to those skilled in the art from the following disclosure.

It has now been found that the useful life of the polyphenyl compositions can be substantially extended by the incorporation therein of small effective amounts of specific antioxidant compositions. Such specific antioxidant compositions are the ferrocene compounds containing at least one benzenoid ring substituent thereto, i.e., aryl-containing substituents thereto. Such aryl groups can be phenyl, phenylene, naphthyl, biphenylyl, etc., which groups can be directly linked to the ferrocene, or linked thereto, or to additional substituent aryl groups, through an oxa ether, thia thioether, low molecular weight alkylene group such as the methylene group, or an amide linkage, of which the —O—, —S—, and —NH—CO— linking groups are preferred. Thus the aryl-containing substituents include the phenoxy, phenylthio, benzyl, and N-phenylcarboxamide groups, which can in turn be further substituted by similar aryl-containing substituents, e.g., phenylphenoxy, phenoxyphenoxy, 3,5 - diphenoxyphenoxy, phenoxyphenylthio, benzylphenoxy, etc. A plurality of such groups can be joined together, preferably in a linear molecule, e.g., a plurality of phenoxy groups similar to the polyphenyl ether, but the size of any such aryl ferrocene derivative should not exceed the size of the polyphenyl ether components per se, and it will be understood that the lower molecular weight aryl ferrocene derivatives are generally preferred, since an increase in the size of the aryl ferrocene derivative proportionally reduces the relative amount of the ferrocene moiety in the compound and therefore requires a similar relative increase in weight percent of added antioxidant to maintain an effective concentration of the ferrocene moiety. The aryl groups may also contain substituent alkyl, cycloalkyl, alkoxy and cycloalkoxy groups, preferably those containing up to 6 carbon atoms of which substituents the tert.-alkyl groups are specifically preferred.

Suitable illustrative ferrocene derivatives containing aryl group substituents therein are phenylferrocene, 3-biphenylylferrocene, m-tolylferrocene, phenoxyferrocene, phenylthioferrocene, (m-phenylphenoxy)ferrocene, m-(2, 4,6 - trimethoxyphenpyl)phenoxyferrocene, (m - benzylphenoxy)ferrocene, (m - tert. - butylphenoxy)ferrocene, (o-phenoxyphenylthio)ferrocene, (p-cyclohexylphenoxy)-ferrocene, m - (m - phenoxyphenoxy)phenoxyferrocene, N - phenylferrocenecarboxamide, 2-naphthoxyferrocene, and the like. It will be understood that the substituents to the aryl moiety of the aryl ferrocene compounds can be in ortho, meta, or para positions with respect to each other when a plurality of substituents groups are employed. However, since the all-meta polyphenyl ethers, or mixed compositions containing a high percentage of meta linkages, generally have the best fluid characteristics of the polyphenyl ethers, it is also preferred that the substituents of the antioxidant aryl ferrocene compositions also be present predominantly in the meta positions.

The optimum concentration of the antioxidant composition will vary with the specific polyphenyl ether composition and the selected particular aryl ferrocene antioxidant compound. In general, suitable concentrations of antioxidants in weight percent of the polyphenyl ether compositions have been found to be from an effective amount up to about 10 weight percent or more, preferably from about 0.05 to about 5 weight percent, and more preferably still from about 0.1 to about 2 weight percent. It should also be understood that the aforesaid concentrations of the antioxidants contemplates a mixed composition of two or more of the herein disclosed class of aryl ferrocene compound antioxidants, as well as the use of a single antioxidant, in which case the aforesaid concentration limits mean the sum of the various aryl ferrocene compound antioxidants employed in a particularly polyphenyl ether composition.

The standard evaluation procedure employed for determining the antioxidant effect of the aryl ferrocene compounds in the polyphenyl ether compositions was by bubbling dry air at the rate of one liter per hour through a 20±0.5=ml. sample of the polyphenyl ether composition, containing a weighed amount of the antioxidant, at 600° F. for a predetermined period of time, e.g., 24 or 48 hours, in a system containing metal discs of aluminum, copper, magnesium, silver, stainless steel, and titanium, and measuring the viscosity of the compositions before and after the above-indicated oxidation treatment. The metal disc specimens (¾ inch outside diameter, ¼ inch inside diameter, and 3/32 inch thick) were cleaned and polished according to the procedure of the MIL–L–9326A oxidation-corrosion test specifications and equally spaced with 1/4 ±1/16 inch in length glass tubes of sufficient inside diameter to slip over the air delivery tube and placed in the following order from top to bottom: magnesium, aluminum, copper, stainless steel, titanium, and silver. The extent of oxidation of the test composition is expressed as the percent change in viscosity of the test sample before and after oxidation in the above-described procedure, i.e., the quotient of the difference in the before and after oxidation viscosities at a particular temperature such as 100° F. and 210° F. over the original viscosity of the test sample at the same test temperatures multiplied by 100.

The polyphenyl ether compositions of the present invention generally embrace those compositions containing from 3 to 10, and preferably from 3 to 7, and more preferably still from 4 to 5 benzene rings in the polyether chain together with corresponding limits of the aforesaid numbers minus one of oxygen ether, and/or sulfur thio ether, linkages therein, i.e., a plurality of oxa and/or thia linkages. Additionally such compositions preferably contain a major proportion of meta-linkages in the sum of the polyphenyl ether components comprising such compositions, i.e., the ether meta-linkages in any particular composition should be of the order of at least about 50 percent of the total ether linkages in said composition. Whereas it is preferred that the polyphenyl ether components be unsubstituted compounds, the polyphenyl ether components can have various hydrocarbyl (i.e. alkyl, cycloalkyl, aralkyl, arkaryl, and aryl) substituents, preferably containing not more than 10 carbon atoms therein. In regard to such substituted components, it is further preferred that any such substituent be free from hydrogen atoms on the carbon atom linked to the benzene ring of the polyphenyl ether, e.g., tert.-butyl, tert.-amyl, 1-methylcyclohexyl, 1-methylcyclopentyl, α-cumyl, tolyl, phenyl, etc. Specifically the polyphenyl ether compositions containing at least 50 percent of the all-meta unsubstituted polyphenyl ether components are preferred as the base fluid of the present invention.

The following examples are illustrative of the instant invention.

EXAMPLE 1

The compound m-(m-phenoxyphenoxy)phenoxyferrocene (M.P. 74.5–75° C.) was prepared by the Ullmann condensation reaction of potassium m-(m-phenoxyphenoxy)phenate with iodoferrocene in the presence of copper-bronze catalyst. Then 2.0 weight percent of the condensation product m-(m-phenoxyphenoxy)phenoxyferrocene was dissolved in the polyphenyl ether m-bis(m-phenoxyphenoxy)benzene and the antioxidant effect of said condensation product determined in the manner of the oxidation stability test procedure at 600° F. for 21 hours and compared with a control evaluation of the polyphenyl ether per se treated in identical manner. The viscosity in centistokes of the polyphenyl ether composition alone and together with the aforesaid condensation product, each at 100° F. and 210° F., both before and after the said oxidation stability test, and the percent change in viscosity observed in such test were as follows:

|  | 100° F. | | | 210° F. | | |
| --- | --- | --- | --- | --- | --- | --- |
|  | Before | After | Percent Change | Before | After | Percent Change |
| Control | 344.1 | 394.9 | 16.7 | 12.81 | 13.41 | 4.7 |
| Antioxidant | 360.5 | 367.3 | 1.9 | 13.00 | 13.12 | 0.9 |

From the foregoing evaluation results it is readily seen that m-(m-phenoxyphenoxy)phenoxyferrocene effectively reduces the rate of viscosity increase of polyphenyl ether compositions when exposed to oxygen at high temperatures.

EXAMPLE 2

In similar fashion to Example 1, a polyphenyl ether composition consisting of 1 weight percent of N-phenyl-ferrocene-carboxamide dissolved in m-bis(m-phenoxyphenoxy)benzene was prepared and evaluated at 600° F. for 24 hours with the following results.

|  | 100° F. | | | 210° F. | | |
| --- | --- | --- | --- | --- | --- | --- |
|  | Before | After | Percent Change | Before | After | Percent Change |
| Control | 338.8 | 413.1 | 21.9 | 12.70 | 13.84 | 9.0 |
| Antioxidant | 354.5 | 368.5 | 3.96 | 12.80 | 13.16 | 2.83 |

EXAMPLE 3

In similar fashion to Example 2, a polyphenyl ether composition consisting of 1 weight percent of N-phenyl-ferrocenecarboxamide dissolved in m - bis(m - phenoxyphenoxy)benzene was prepared and evaluated at 600° F. for 48 hours in a system which did not contain the magnesium disc with the following results.

|  | 100° F. | | | 210° F. | | |
| --- | --- | --- | --- | --- | --- | --- |
|  | Before | After | Percent Change | Before | After | Percent Change |
| Control | 360.5 | 622.5 | 72.6 | 13.03 | 16.65 | 27.8 |
| Antioxidant | 373.0 | 482.3 | 29.3 | 13.04 | 15.07 | 15.6 |

EXAMPLE 4

A mixed polyphenyl ether composition consisting of about 65 parts m - bis(m - phenoxyphenoxy)benzene, 30 parts m - (m - phenoxyphenoxy)phenyl p-phenoxyphenyl ether, and 5 parts m-bis(p-phenoxyphenoxy)benzene containing 1 weight percent N-phenylferrocenecarboxamide was prepared. It was observed that said ferrocene compound was readily dissolved in the hot polyphenyl ether composition and remained in solution on cooling. The antioxidant effect of the N-phenylferrocenecarboxamide was determined in the manner of the oxidation stability test procedure at 600° F. for 48 hours, as set out hereinabove, and from the following evaluation results, it will be observed that the said ferrocene compound effectively reduces the rate of viscosity increase of polyphenyl ether compositions when exposed to oxygen at high temperatures.

|  | 100° F. | | | 210° F. | | |
| --- | --- | --- | --- | --- | --- | --- |
|  | Before | After | Percent Change | Before | After | Percent Change |
| Control | 376.4 | 609.2 | 61.8 | 13.23 | 16.55 | 25.0 |
| Antioxidant | 385.3 | 438.9 | 13.9 | 13.35 | 14.21 | 6.5 |

In similar manner various other disclosed aryl ferrocene compounds are also suitable antioxidants in polyphenyl ether compositions when compounded in effective amounts therein.

I claim:

1. A functional fluid composition comprising a fluid polyphenyl ether base having from 3 to 10 benzene rings and a sum of from 2 to 9 linking groups therein, selected from the group consisting of oxa and thia ether linkages, wherein at least 50 percent of said ether linkages are meta-linkages, and from about 0.05 to about 10 weight percent, based on the polyphenyl ether, of N-phenylferrocenecarboxamide as an antioxidant therein.

References Cited

UNITED STATES PATENTS

| 2,763,617 | 9/1956 | Scott et al. | 44—68 |
| 3,064,026 | 11/1962 | Rausch | 260—439 |
| 3,098,864 | 7/1963 | Rausch | 260—439 |
| 3,102,916 | 9/1963 | Reifschneider | 252—45 |
| 3,114,713 | 12/1963 | Coffield | 252—482 |
| 3,130,017 | 4/1964 | Shapiro et al. | 44—68 |
| 3,217,019 | 11/1965 | DeYoung | 252—49.7 |

FOREIGN PATENTS 851,651  10/1960  Great Britain.

DANIEL E. WYMAN, *Primary Examiner.*

L. G. XIARHOS, P. E. KONOPKA, *Assistant Examiners.*